(12) United States Patent
Jeong

(10) Patent No.: US 6,421,539 B1
(45) Date of Patent: Jul. 16, 2002

(54) METHOD FOR REGISTERING THE LOCATION OF A MOBILE STATION AFTER PERFORMING INTER-MSC SOFT HANDOFF IN A CELLULAR

(76) Inventor: Jin-soo Jeong, 2-511 Samhwan APT., Karak-dong, Songpa-su, Seoul, 138-160 (KR)

( * ) Notice: Subject to any disclaimer, the term of this patent is extended or adjusted under 35 U.S.C. 154(b) by 0 days.

(21) Appl. No.: 09/384,856

(22) Filed: Aug. 27, 1999

(30) Foreign Application Priority Data

Aug. 27, 1998 (KR) ............................................ 98-34784

(51) Int. Cl.[7] ................................................. H04Q 7/20
(52) U.S. Cl. ........................ 455/442; 455/436; 455/440; 455/433
(58) Field of Search .................................. 455/433, 436, 455/437, 439, 440, 442, 443, 456

(56) References Cited

U.S. PATENT DOCUMENTS 5,901,352 A * 5/1999 St-Pierre et al. ............. 455/426
6,009,328 A * 12/1999 Muszynski .................. 455/442
6,097,951 A * 8/2000 Ernam et al. ................ 455/433

* cited by examiner

Primary Examiner—Daniel Hunter
Assistant Examiner—Alan T. Gantt
(74) Attorney, Agent, or Firm—Klauber & Jackson

(57) ABSTRACT

The present invention discloses a method for registering the location of a mobile station after performing inter-MSC (mobile switching center) soft handoff in a cellular system. The cellular system has a plurality of base transceiver stations (BTSs) and a plurality of the MSCs, the plurality of BTSs rendering the mobile communication service to the mobile stations in a specific area. The method has the steps of performing inter-MSC soft handoff according to the movement of a mobile station from a BTS in service to the different BTSs which are controlled by another MSC, completing the call by the mobile station normally and synchronizing with the BTS having the strongest pilot signal, ordering to the mobile station to register the location of the mobile station by the synchronized BTS and performing the location registration to the MSC controlling the synchronized BTS by the mobile station through the synchronized BTS.

8 Claims, 3 Drawing Sheets

METHOD FOR REGISTERING THE LOCATION OF A MOBILE STATION AFTER PERFORMING INTER-MSC SOFT HANDOFF IN A CELLULAR

CLAIM OF PRIORITY

This application makes reference to, incorporates the same herein, and claims all benefits accruing under 35 U.S.C. §119 arising from an application entitled, METHOD FOR REGISTERING THE LOCATION OF A MOBILE STATION AFTER PERFORMING INTER-MSC SOFT-HANDOFF IN A CELLULAR, earlier filed in the Korean Industrial Property Office on Aug. 27, 1998, and there duly assigned Serial No. 1998-34784.

FIELD OF THE INVENTION

The present invention relates to a method for registering the location of a mobile station after performing inter-mobile switching centers (MSCs) soft handoff in a cellular system using code division multiple access (CDMA) technology. Particularly, it is related to a method for detecting the location information of the mobile station by the MSC after the inter-MSC soft handoff is performed in a cellular system.

DESCRIPTION OF THE RELATED ART

The cellular system divides the entire service area into a plurality of the base station areas (i.e., cells) and the base stations are controlled by a mobile switching center (MSC). It is not unusual that a subscriber of a mobile telephone (MT) system makes a call while traveling between cells.

In the cellular system, when a mobile telephone (MT) moves from one cell area into another, the call connection is maintained by a handoff between mobile switching centers (MSCs). The handoff occurs when the system recognizes that the MT has moved from a previously identified cell area into another cell area.

FIG. 1 is an exemplary block diagram showing an inter-MSC handoff procedure according to the prior art. As shown in FIG. 1, when an MT (10) moves from a cell area of base transceiver station (BTS) 1 (20), which belongs to a MSC 1 (30), to another cell area of base transceiver station (BTS) 2 (50), which belongs to a MSC 2 (40), an inter-MSC handoff must occur.

When an inter-MSC handoff occurs, it is impossible to exchange the information which is necessary for a smooth handoff because the base transceiver stations 1 and 2 belong to different respective MSCs. Instead, the MT performs a hard handoff by cutting off the channel of the base station (BTS) 1 and connecting to the channel of the base station (BTS) 2. However, such a hard handoff may degrade the call quality.

An improved prior art CDMA system provides an inter-MSC soft handoff using a router for connecting two base transceiver stations, which belong to the different respective MSCs. A soft handoff is a method for connecting a MT with two or more base transceiver stations at the same time. The MT selects the strongest signal among all of the signals received from the plurality of base transceiver stations, and then demodulates it. This multiple reception permits the base transceiver stations connected with the MT to exchange the necessary information about a call with each other.

FIG. 2 is an exemplary block diagram showing the inter-MSC handoff procedure according to the prior art. As shown in the figure, a cellular system providing an inter-MSC soft handoff connects the two base transceiver stations (BTSs) (20) (50) via routers (60) (70), wherein the two base transceiver stations (20) (50) belong to the different respective MSCs. The two routers are connected via relay line (1).

After the MT (10) initially establishes a call with the BTS 1 (20), should the MT (10) move into the area of BTS 2 (50), then BTS 1 (20) requests a soft handoff to BTS 2 (50) via the routers (60) (70). If the soft handoff is made, the BTS 1 (20) selects the best (strongest) received signal from among the signal directly from the MT and the signal received via BTS 2 (50) and routers (60) (70), which is then transmitted to the MSC 1 (30). The MSC 1 (30) transmits the received signal from the base station 1 (20) to the called side.

Through the procedure described in the above, the MT is able to connect the channel with the BTS 1 (20) and the base station 2 (50) at the same time, wherein the two BTSs (50) belong to the different respective MSCs.

As described above, in the case where the MT performs a call through the inter-MSC soft handoff, the two MSCs (30) (40) do not know the present location of the MT (10) (i.e., the cell servicing area of the BTS in which the MT (10) is presently located) because the MT (10) is moving the between boundary area of the two BTSs (20) (50).

During a busy state, the MT can connect its channel with the two BTSs at the same time via soft handoff. However, when the MT is in an idle state it is synchronized only with a single BTS.

If the MT (10) is located within a servicing area of BTS 2 (50), and a call is completed, the BTS 1 (20) reports to the MSC 1 (30) the information about the handoff completion because BTS 1 (20) was the base station originally connected to the MT 10 and the MSC 1 (30). However, an error occurs about the location of the MT (10) because in reality the MT (10) is actually synchronized with BTS 2 (50) in the area of the MSC 2 (40).

Accordingly, in the prior art, in the case where there is a first MSC in which the MT is located and a second MSC which was notified with the information about the completion of the handoff, if the first and second MSCs are different, the first MSC doesn't transmit the location information about the completion of the first MSC handoff to the second MSC in which the MT is now located. When a call is completed after an inter-MSC soft handoff has occurred and if a called signal arrives at the MT, then other MSC cannot process the called signal.

SUMMARY OF THE INVENTION

According to a first preferred embodiment of the present invention, a method for registering the location of a mobile station after performing an inter-MSC soft handoff in a cellular system, wherein the cellular system has a plurality of base transceiver stations (BTSs) and a plurality of the MSCs, and in which the plurality of BTSs provide mobile communication service to the mobile stations in a specific area, said method comprising the steps of:

(a) performing an inter-MSC soft handoff according to the movement of a mobile station from a first BTS in service to at least a second BTS which is controlled by a different MSC than said first BTS;

(b) synchronizing the mobile station with a BTS from among said plurality of BTSs so that said synchronized BTS has a strongest pilot signal after normal completion of a call;

(c) ordering said mobile station to register a location of said mobile station with said synchronized BTS; and (d) performing a location registration of said mobile station to an MSC controlling said synchronized BTS with the registered location of said mobile station registered in step (c).

According to the first embodiment, it is preferable that the inter-MSC soft handoff performed is performed with the use of a router; the router connects the two neighboring BTSs, the two BTSs are controlled by different respective MSCs.

According to the first embodiment, it is preferable that a first BTS, which is initially connected to the MSC, receives the necessary information after call completion, not through the MSC to which the first BTS belongs, but from a second BTS corresponding to the inter-MSC handoff through the router and other controls of the inter-MSC soft handoff.

According to a second preferred embodiment of the present invention, a method for registering the location of a mobile station after performing inter-MSC soft handoff in a cellular system, wherein the cellular system has a plurality of base transceiver stations (BTSs) and a plurality of the MSCs, and in which the plurality of BTSs provide the mobile communication service to the mobile stations in a specific area, said method comprising the steps of:

(a) performing an inter-MSC soft handoff according to the movement of a mobile station from a first BTS in service to at least another BTS which is controlled by an MSC other than an MSC which controls said first BTS;

(b) said mobile station abnormally completing the call after performing said inter-MSC soft handoff;

(c) synchronizing said mobile station with a BTS having the strongest pilot signal;

(d) ordering said mobile station to register a location of said mobile station with said synchronized BTS having the strongest pilot signal; and (e) performing a location registration to an MSC controlling said synchronized BTS with the registered location of said mobile station registered in step (d).

According to the second embodiment, it is preferable in the embodiment that the inter-MSC soft handoff is performed by using a router, and the router connects the two neighboring BTSs, and the two BTSs controlled by different respective MSCs.

According to the second embodiment, it is preferable that a BTS initially connected to the MSC receives the necessary information from a BTS corresponding to the inter-MSC handoff through the router and other controls of the inter-MSC soft handoff, and not through an MSC to which the BTS belongs.

According to a third preferred embodiment of the present invention, a method for registering the location of a mobile station after performing inter-MSC soft handoff in a cellular system, wherein the cellular system has a plurality of base transceiver stations (BTSs) and a plurality of the MSCs, and in which the plurality of BTSs provide the mobile communication service to the mobile stations in a specific area, said method comprising the steps of:

(a) performing an inter-MSC soft handoff according to the movement of a mobile station from a first BTS in service to at least one other BTS which is controlled by an MSC other than the MSC controlling said first BTS;

(b) updating the status of said mobile station to idle state after said inter-MSC soft handoff and completion of the call by said mobile station;

(c) synchronizing said mobile station in the idle state with any one of a plurality of neighboring BTSs to said mobile station; and (d) performing a location registration of said mobile station to an MSC controlling said synchronized BTS through said synchronized BTS.

According to the third embodiment, it is preferable that the method further comprises a step of requesting the location registration to the mobile station by the synchronized BTS before performing said step of performing the location registration of the mobile station.

According to the third embodiment, it is preferable that the inter-MSC soft handoff is performed by a router; the router connects the two neighboring BTSs, and the two BTSs are controlled by different respective MSCs.

It is preferable that said step of completing the call of the mobile station is performed after the completion of the inter-MSC soft handoff.

It is also preferable that said step of completing the call of the mobile station is performed during the period that the inter-MSC soft handoff is performed.

DESCRIPTION OF THE PREFERRED EMBODIMENTS

According to a first preferred embodiment of the present invention, a method for registering the location of a mobile station after performing inter-MSC soft handoff in a cellular system, wherein the cellular system having a plurality of base transceiver stations (BTSs) and a plurality of the MSCs, and in which the plurality of BTSs rendering the mobile communication service to the mobile stations in a specific area, the inter-MSC soft handoff is performed according to the movement of a mobile station from a BTS in service to the different BTSs which are controlled by another MSC. After the mobile station completes the call normally, it synchronizes with the BTS having the strongest pilot signal. The mobile station is ordered to register the location of the mobile station by the synchronized BTS. Subsequently, the location registration is performed to the MSC controlling the synchronized BTS by the mobile station through the synchronized BTS.

It is preferable in the embodiment that the inter-MSC soft handoff is performed using a router; the router connects the two neighboring BTSs, and the two BTSs controlled by different respective MSCs.

It is preferable that a BTS connected to the MSC for the first time gets the necessary information t from a BTS corresponding to the handoff through the router and controls the inter-MSC soft handoff, rather than from an MSC to which the BTS belongs.

Figure 1:
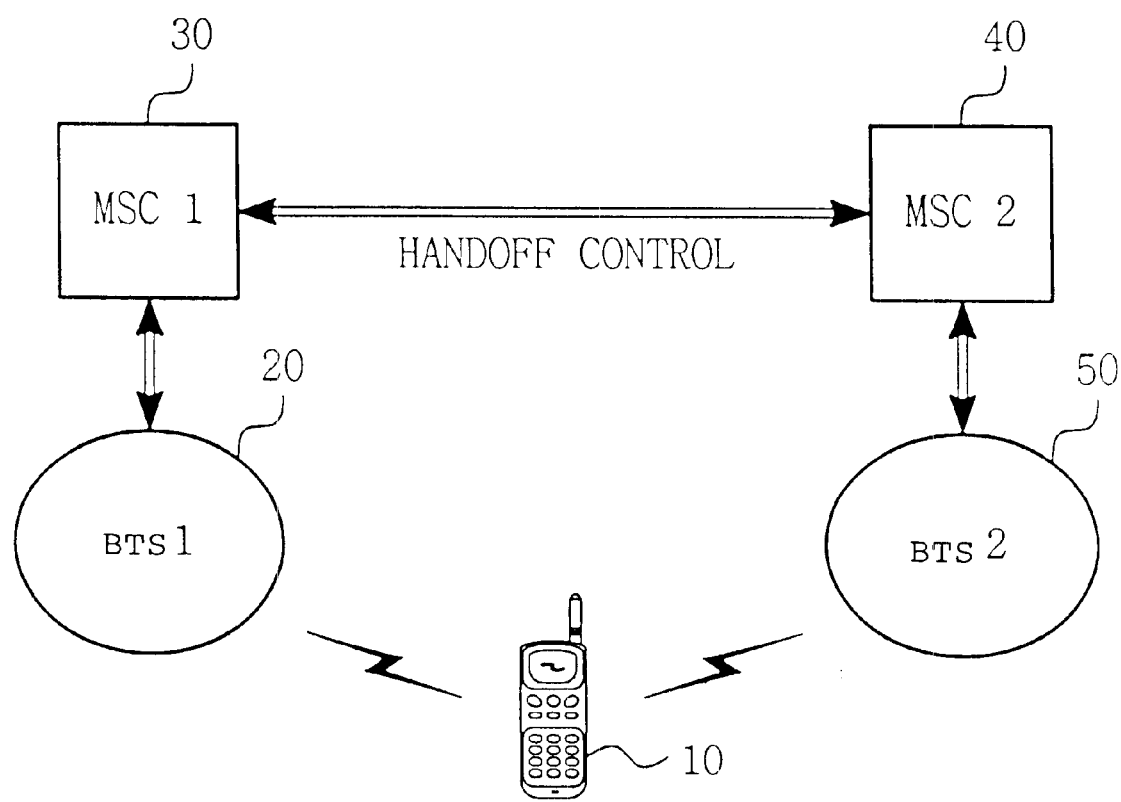
FIG. 1 is an exemplary block diagram showing the inter-MSC handoff procedure according to the prior art.
Figure 2:
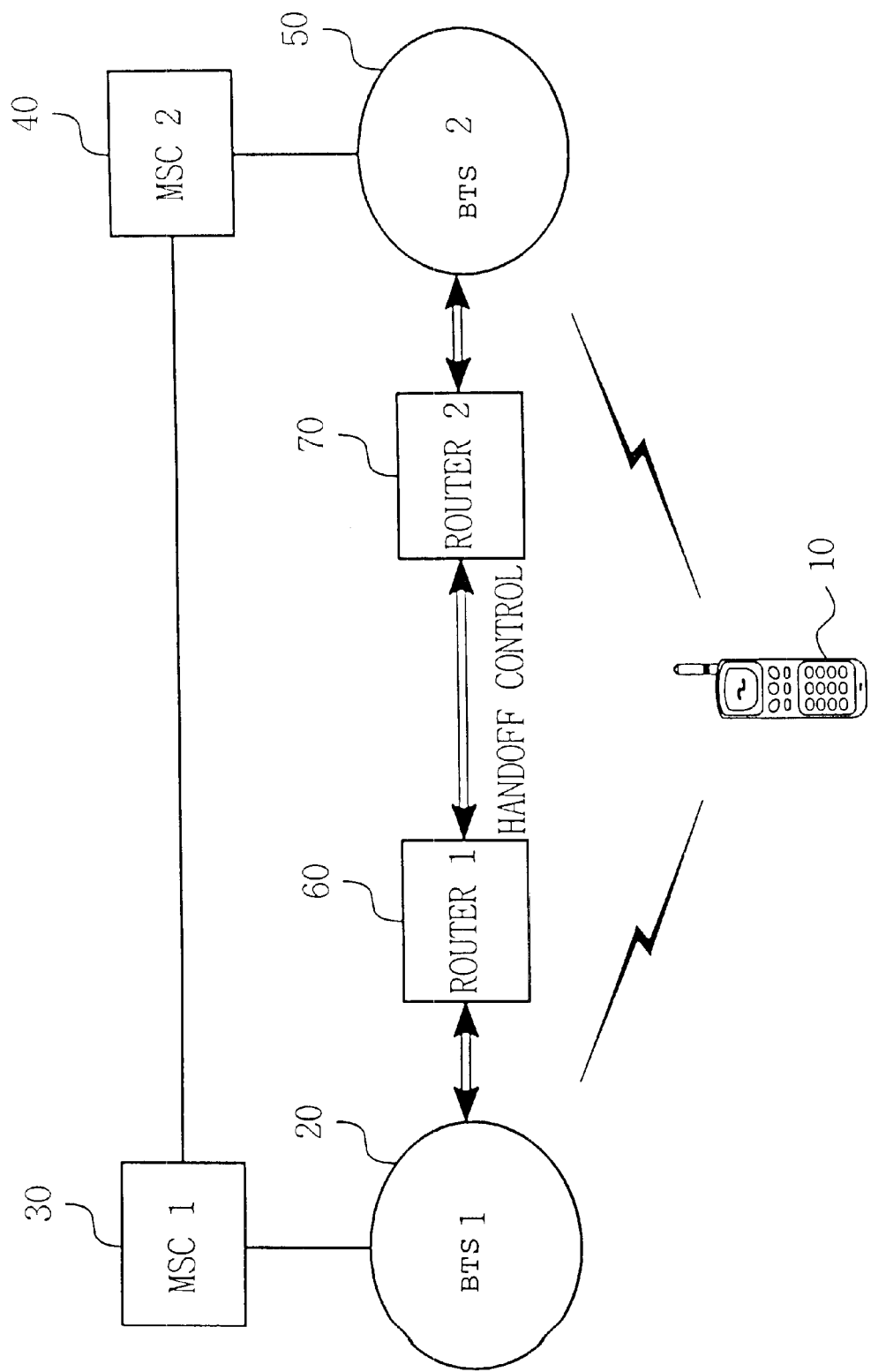
FIG. 2 is an exemplary block diagram showing the inter-MSC soft handoff procedure according to the prior art.

After performing an inter-MSC soft handoff in a cellular system as depicted in FIG. 2, a channel (not shown) of an MT 10 is connected with the base transceiver station BTS 1 (20) and the BTS 2 (50) (that is, in handoff state), when a call is completed either normally or abnormally. The term "abnormally" applies to all completed calls that are not a consequence of the end of a conversation, such as dropped calls, timed out calls, lost connections from dead spots and/or RF interference, and/or hardware or software malfunctions of the MSC, BTS, MT, and any other equipment such as routers, antennas, etc.

The MT 10 is synchronized with the BTS having the stronger pilot signal, and the MT 10 sends an "acknowledge" or ack signal. The synchronized BTS detects the ack signal and requests to the MT 10 to register its location.

According to the second preferred embodiment of a method for registering the location of a mobile station after performing inter-MSC soft handoff in a cellular system according to the present invention, wherein the cellular system having a plurality of base transceiver stations (BTSs) and a plurality of the MSCs, and in which the plurality of BTSs rendering the mobile communication service to the mobile stations in a specific area, the inter-MSC soft handoff is performed according to the movement of a mobile station from a BTS in service to the different BTSs which are controlled by another MSC. After performing the inter-MSC soft handoff, the call is abnormally completed by the mobile station. After the abnormal completion, the mobile station synchronizes with the BTS having the strongest pilot signal. The synchronized BTS orders the mobile station to register its location with the synchronized BTS. Finally, the location registration registered in the synchronized BTS is forwarded to the MSC which controls the synchronized BTS from the synchronized BTS, rather than the first BTS.

It is preferable in the embodiment that the inter-MSC soft handoff is performed using a router, the router connecting the two neighboring BTSs, the two BTSs controlled by different respective MSC.

It is preferable that a BTS initially connected to the MSC receives the necessary location information from the second BTS receiving the handoff through the router and controls of the inter-MSC soft handoff, rather than from an initial MSC to which the first BTS belongs.

In a third preferred embodiment of a method for registering the location of a mobile station after performing inter-MSC soft handoff in a cellular system according to the present invention, wherein the cellular system having a plurality of base transceiver stations (BTSs) and a plurality of the MSCs, in which the plurality of BTSs providing the mobile communication service to the mobile stations in a specific area, the inter-MSC soft handoff is performed according to the movement of a mobile station from a BTS in service to the different BTSs which are controlled by another MSC. After the inter-MSC soft handoff, the call is completed, and the status of the mobile station is made idle. After becoming idle, the mobile station becomes synchronized with any one of the neighboring BTSs to the mobile station. After the synchronization, the location registration is performed to the MSC controlling the synchronized BTS by the mobile station through said synchronized BTS. This step permits the most recent (and accurate) location information to be recorded in the MSC.

It is preferable in this embodiment to include a step of requesting the location registration of the mobile station by the synchronized BTS before performing said step of performing the location registration by the mobile station.

It is also preferable that the inter-MSC soft handoff is performed using a router; the router connects the two neighboring BTSs, and the two BTSs controlled by different MSC respectively.

It is preferable that the step of completing the call of the mobile station is performed after the completion of the inter-MSC soft handoff.

It is also preferable that said step of completing the call of the mobile station is performed during the period that the inter-MSC soft handoff is performed.

An improved CDMA system provides an inter-MSC soft handoff using routers connecting the base stations, which belong to the different MSCs respectively. In such cases, because the handoff is controlled only by the base station, the MSC cannot know the present location of the MT. Accordingly, the location of the MT should be registered to the MSC necessary to connect another called signal to the MT after the call completion.

In the location registration method, whether a call is completed normally or abnormally and the MT goes into an idle state after inter-MSC soft handoff has occurred, the base station orders the MT in idle state to register the location of the MT.

Generally, the MT in idle state checks the pilot signals of the neighboring base stations continuously and is synchronized with the base station transmitting the strongest pilot signal and transmits the synchronized base station its own ack signal. The base station recognizes that the MT is located in his area by receiving the ack signal from the MT.

In the present invention, after the inter-MSC soft handoff has occurred from base station 1 to the base station 2, if the MT terminates a call, either normally or abnormally, the base station synchronized with the MT requests the MT to register the location.

In a first example, in case the channel of an MT is connected with the BTS 1(20) and the BTS 2 (50) (that is, in the handoff state), if a call is completed either normally or abnormally, the MT is synchronized with the base station having the stronger pilot signal and sends the ack signal. The synchronized BTS detects the ack signal and requests to the MT to register the location.

In a second example, if the MT moves far into the area of the base station 2, it drops the channel connected with the BTS 1 (20) and terminates the soft handoff. In this case, if the MT completes the call, either normally or abnormally, it is synchronized with the BTS 2 (50) and sends an ack signal. BTS 2 (50) detects the ack signal of the MT and requests to the MT to its register location.

It is preferable in the embodiment that said method further comprises a step of requesting the location registration to the mobile station by the synchronized BTS before performing said step of performing the location registration by the mobile station.

Figure 3:
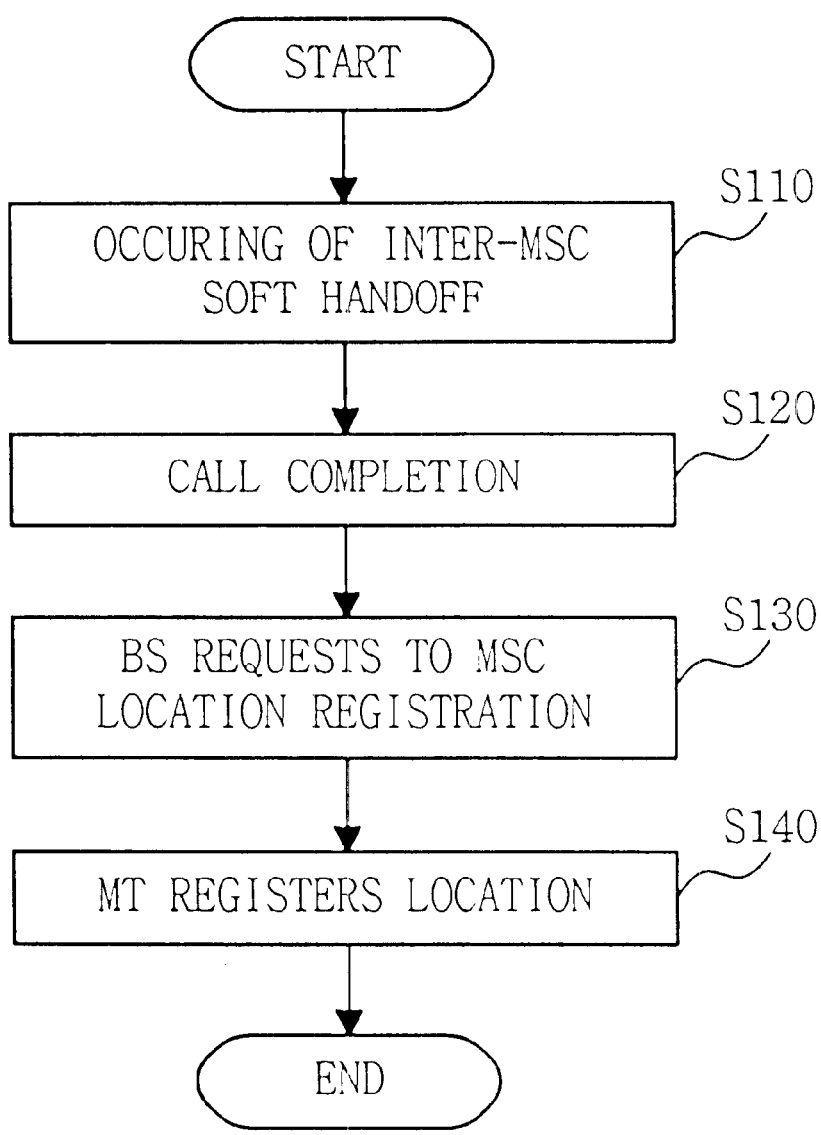
FIG. 3 is a flow chart showing the location registration method according to the inter-MSC soft handoff of the present invention.

FIG. 3 is a flow chart illustrating a method for registering the location according to the inter-MSC soft handoff of the present invention. Below, the principle of the operation of the preferred embodiment of the present invention is described referring to the FIGS. 2 and 3.

If the MT (10) in communication with the BTS 1 (20) moves into the area of the BTS 2 (50) which belongs to a different MSC (40), the BTS 1 (20) requests to the BTS 2 (50) for a soft handoff through the routers (60)(70). If a soft handoff is made, the MT (10) can connect the channel with the base station 1 (20) and base station 2 (50) at the same time (step s110).

After the inter-MSC soft handoff has occurred, if the MT (10) terminates the call normally or abnormally and the MT (20) becomes idle state (step s120), the MT (10) in idle state is synchronized with the BTS having the strongest pilot signal among the neighboring base stations.

The synchronized base station sends a message to request the location registration in order to request "the location registration by order" (step s130) to the MT (10). The MT receives "the location registration by order" and sends a registration message (step s140) to the base station location The base station received the location registration message transmits the received message from the MT to the MSC to which it belongs.

Through the above procedure, the MSC can know the real location of the MT. If a call signal is requested from the subscriber of the different system, the MSC receives the location registration message from the MT requesting the call signal.

It is preferable that the inter-MSC soft handoff is an inter-MSC soft handoff using a router, the router connecting the two neighboring BTSs, the two BTSs controlled by different MSC respectively.

It is preferable that the step of completing the call of the mobile station is performed after the completion of the inter-MSC soft handoff.

It is preferable that the step of completing the call of the mobile station is performed during the period that the inter-MSC soft handoff is performed.

An improved CDMA system provides an inter-MSC soft handoff using routers connecting the base stations, which belong to the different MSCs respectively. In such a case, because the handoff is controlled only by the base station, the MSC cannot know the present location of the MT. Accordingly, the location of the MT should be registered to the MSC to connect the called signal to the MT after the call completion.

In the location registration method, if a call is completed normally or abnormally and the MT becomes in idle state after inter-MSC soft handoff has occurred, the base station orders to the MT in idle state to register location.

Generally, the MT in idle state checks the pilot signals of the neighboring base stations continuously and is synchronized with the base station transmitting the strongest pilot signal and transmits the synchronized base station its own ack signal. The base station recognizes that the MT is located in his area by receiving the ack signal from the MT.

At the present invention, after the inter-MSC soft handoff has occurred from base station 1 to the base station 2, if the MT terminates a call normally or abnormally, the base station synchronized with the MT requests to the MT to register the location.

In the present invention, the representative effects are as follows: After inter-MSC soft handoff has occurred, if a call is completed, the base station orders to the MT to register the present location. Then the MSC detects the location of the MT quickly. Therefore the MSC can process the called signal with the correct location information of the MT.

In the present invention, after the MT performs the inter-MSC soft handoff or during the performing the inter-MSC soft handoff and the call is cut off, the MSC can update the location information of the MT and increase the success rate of the called signal.

What is claimed is:

1. A method for registering the location of a mobile station after performing inter-MSC (mobile switching center) soft handoff in a cellular system of the type having a plurality of base transceiver stations (BTSs) and a plurality of the MSCs, said method comprising the steps of:

(a) performing an inter-MSC soft handoff according to the movement of said mobile station from a first BTS controlled by a first MSC to a second BTSs controlled by a second MSC;

(b) synchronizing said mobile station with a said second BTS, wherein said second BTS having the strongest pilot signal;

(c) ordering said mobile station to register a location of said mobile station by said synchronized second BTS; and, (d) performing a location registration to said second MSC controlling said synchronized second BTS with the registered location of said mobile station registered in step (c), wherein said inter-MSC soft handoff is performed by using a router, said router connecting said first BTS and said second BTS.

2. The method as set forth in claim 1, wherein said first BTS initially connected to said MSC receives information about location registration from said second BTS connected in said inter-MSC handoff via said router.

3. A method for registering the location of a mobile station after performing inter-MSC (mobile switching center) soft handoff in a cellular system of the type having a plurality of base transceiver stations (BTSs) and a plurality of the MSCs, said method comprising the steps of:

(a) performing an inter-MSC soft handoff according to the movement of said mobile station from a first BTS controlled by a first MSC to a second BTSs controlled by a second MSC;

(b) abnormally completing a call by said mobile station after performing said inter-MSC soft handoff;

(c) synchronizing said mobile station with a said second BTS, wherein said second BTS having the strongest pilot signal;

(d) ordering said mobile station to register a location of said mobile station by said synchronized second BTS; and, (e) performing a location registration to said second MSC controlling said synchronized second BTS with the registered location of said mobile station registered in step (d), wherein said inter-MSC soft handoff is performed by using a router, said router connecting said first BTS and said second BTS.

4. The method as set forth in claim 3, wherein said first BTS initially connected to said MSC receives information about location registration from said second BTS connected in said inter-MSC handoff via said router.

5. A method for registering the location of a mobile station after performing inter-MSC (mobile switching center) soft handoff in a cellular system of the type having a plurality of base transceiver stations (BTSs) and a plurality of the MSCs, said method comprising the steps of:

(a) performing an inter-MSC soft handoff according to the movement of said mobile station from a first BTS controlled by a first MSC to a second BTSs controlled by a second MSC;

(b) updating the status of said mobile station during an idle state after said inter-MSC soft handoff and completion of a call by said mobile station;

(c) synchronizing said mobile station with a said second BTS, wherein said second BTS having the strongest pilot signal;

(d) performing a location registration to said second MSC controlling said synchronized second BTS with the registered location of said mobile station registered in step (c); and, (e) requesting a location registration of said mobile station by said synchronized BTS before performing step (d), wherein said inter-MSC soft handoff is performed by using a router, said router connecting said first BTS and said second BTS.

6. The method as set forth in claim 5, wherein said step of completing the call of said mobile station is performed after the completion of the inter-MSC soft handoff.

7. The method as set forth in claim 5, wherein said step of updating the status of said mobile station and completing the call is performed during a time period when said inter-MSC soft handoff is performed.

8. The method as set forth in claim 5, wherein said step of updating the status of said mobile station and completing the call is performed during a time period when said inter-MSC soft handoff is performed.

* * * * *

UNITED STATES PATENT AND TRADEMARK OFFICE
CERTIFICATE OF CORRECTION

PATENT NO. : 6,421,539 B1
DATED : July 16, 2002
INVENTOR(S) : Jin-soo Jeong

It is certified that error appears in the above-identified patent and that said Letters Patent is hereby corrected as shown below:

Title page,
Item [73], Assignee, should read as follows:
-- Samsung Electronics Co., Ltd.
  416, Maetan-Dong, Paldal-Gu
  Suwon-City, Kyungki-do, Korea
  Republic of Korea --

Signed and Sealed this

Sixteenth Day of November, 2004

JON W. DUDAS
*Director of the United States Patent and Trademark Office*